United States Patent
Wang et al.

(10) Patent No.: US 10,272,524 B2
(45) Date of Patent: Apr. 30, 2019

(54) LASER CONDUCTION MODE WELDING OF ALUMINUM ALLOYS WITH CROSS DUAL LASER BEAMS

(71) Applicant: GM GLOBAL TECHNOLOGY OPERATIONS LLC, Detroit, MI (US)

(72) Inventors: Hui-Ping Wang, Troy, MI (US); Blair E. Carlson, Ann Arbor, MI (US); Michael G. Poss, Rochester Hills, MI (US); David A. Gatny, Sterling Heights, MI (US); Perry G. Leggett, Dallas, TX (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 14/521,198

(22) Filed: Oct. 22, 2014

(65) Prior Publication Data

US 2016/0114428 A1   Apr. 28, 2016

(51) Int. Cl.
*B23K 26/26* (2014.01)
*B23K 26/32* (2014.01)
(Continued)

(52) U.S. Cl.
CPC .......... *B23K 26/26* (2013.01); *B23K 26/0648* (2013.01); *B23K 26/0676* (2013.01);
(Continued)

(58) Field of Classification Search
None
See application file for complete search history.

(56) References Cited

U.S. PATENT DOCUMENTS

| 4,691,093 A * | 9/1987 | Banas ................. B23K 15/004 |
| | | 219/121.63 |
| 2002/0104833 A1* | 8/2002 | Bradley ............. B23K 26/0884 |
| | | 219/121.63 |

(Continued)

FOREIGN PATENT DOCUMENTS

| CN | 101254562 A | 9/2008 |
| CN | 101733553 A | 6/2010 |

(Continued)

OTHER PUBLICATIONS

Benedyk, J.C., "Aluminum Alloys for Lightweight Automotive Structures", 2010, p. 1-35.*

(Continued)

*Primary Examiner* — David P Turocy
(74) *Attorney, Agent, or Firm* — Reising Ethington P.C.

(57) ABSTRACT

A method of laser welding aluminum alloy workpieces with dual laser beams arranged in a cross-beam orientation is disclosed. The method comprises directing dual laser beams, which include a first laser beam and a second laser beam, at and along a weld seam established between the aluminum alloy workpieces together with a filler wire. The first laser beam includes a first longitudinal axis and the second laser beam includes a second longitudinal axis. When arranged in the cross-beam orientation, a plane that intersects the first longitudinal axis and the second longitudinal axis of the first and second laser beams, respectively, forms a line where it meets the aluminum alloy workpieces that is oriented transverse to the weld seam.

19 Claims, 2 Drawing Sheets

(51) Int. Cl.
*B23K 26/067* (2006.01)
*B23K 35/28* (2006.01)
*B23K 26/06* (2014.01)
*B23K 26/08* (2014.01)
*B23K 26/242* (2014.01)
*B23K 26/211* (2014.01)
*B23K 103/10* (2006.01)

(52) U.S. Cl.
CPC ........ *B23K 26/0884* (2013.01); *B23K 26/211* (2015.10); *B23K 26/242* (2015.10); *B23K 26/32* (2013.01); *B23K 35/286* (2013.01); *B23K 2103/10* (2018.08)

(56) References Cited

U.S. PATENT DOCUMENTS

| | | | |
|---|---|---|---|
| 2002/0125229 A1* | 9/2002 | Stiers | B21D 39/021 219/121.63 |
| 2006/0261045 A1 | 11/2006 | Wang et al. | |
| 2007/0012670 A1* | 1/2007 | Stuut | B23K 9/296 219/125.1 |
| 2008/0017696 A1* | 1/2008 | Urech | B23K 1/0008 228/256 |
| 2008/0128053 A1* | 6/2008 | Jansen | B23K 26/24 148/400 |
| 2009/0114625 A1 | 5/2009 | Palmquist et al. | |
| 2010/0200554 A1* | 8/2010 | Uchida | B23K 9/1278 219/137 R |
| 2011/0042361 A1 | 2/2011 | Nowak et al. | |

FOREIGN PATENT DOCUMENTS

| | | |
|---|---|---|
| CN | 101850472 A | 10/2010 |
| CN | 101992350 A | 3/2011 |
| CN | 103862178 A | 6/2014 |
| DE | 10113471 A1 | 10/2002 |
| DE | 102008061224 A1 | 6/2010 |

OTHER PUBLICATIONS

Kim, J.K., Lim, H.S, Cho, J.H., Kim, C.H., "Bead-On-Plate Weldability of Al 5052 Alloy Using a Disk Laser", 2008, Journal of Achievements in Materials and Manufacturing Engineering, 28, p. 187-190.*

* cited by examiner

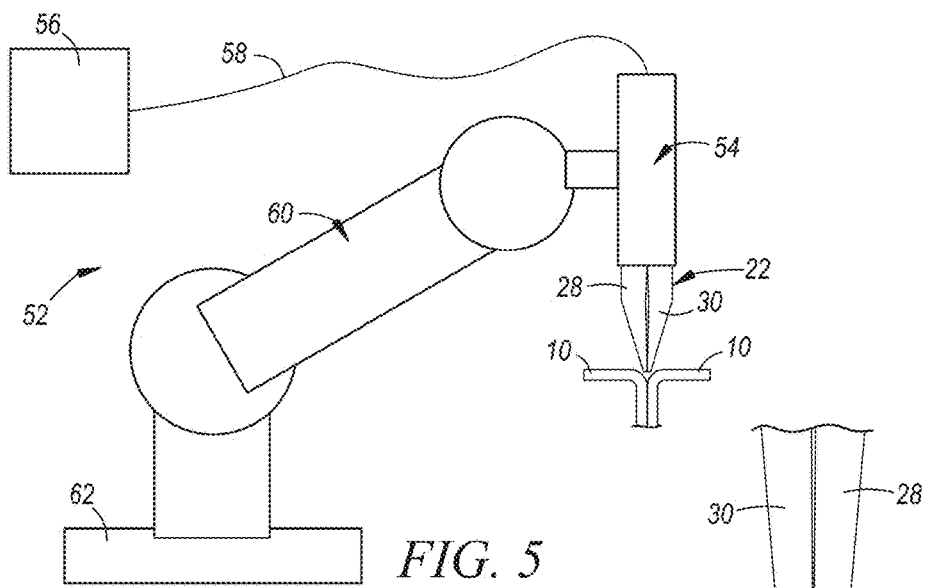
FIG. 5
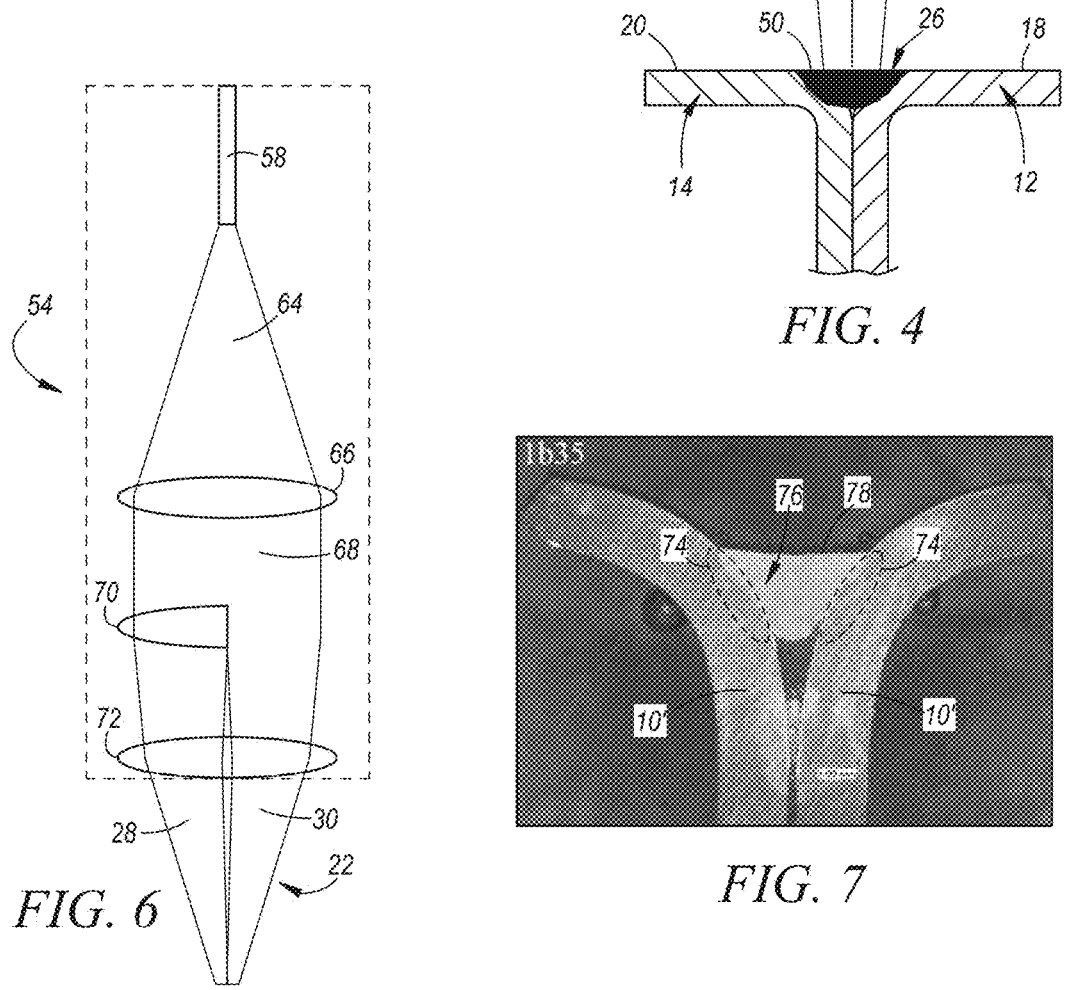
FIG. 4
FIG. 6
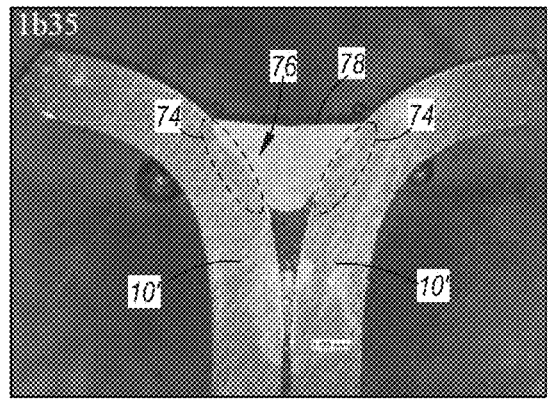
FIG. 7

LASER CONDUCTION MODE WELDING OF ALUMINUM ALLOYS WITH CROSS DUAL LASER BEAMS

TECHNICAL FIELD

The technical field of this disclosure relates generally to laser welding and, more specifically, to a method for laser welding aluminum alloy workpieces.

BACKGROUND

There are many instances in a manufacturing setting where two aluminum alloy workpieces need to be joined along a shared interface. The automotive industry, for example, often chooses to laser weld aluminum alloy panels when constructing certain vehicle component parts. These vehicle component parts can include the roof, decklid, and trunk, to name but a few. And when laser welding is necessitated at what will become a Class A surface of the component part, which is typically a styled and non-planar visible surface on the vehicle exterior, the aesthetic appearance of the weld joint takes on added significance. The laser weld joint, in particular, must meet certain acceptable appearance standards so that, when the vehicle component part is painted, the show surface of the part is not rendered aesthetically unappealing.

Laser welding is a metal joining process in which a laser beam provides the energy needed to effectuate welding. In practice, a laser optic head focuses and directs the laser beam at a weld seam established between the two workpieces while a robot arm moves the laser optic head to translate the laser beam along the weld seam. When laser welding together two aluminum alloy workpieces, a filler wire is typically tracked along the weld seam in coordination with the movement of the laser beam so that a working end of the filler wire is impinged by the laser beam in the presence of a shielding gas. The filler wire absorbs the energy of the laser beam and melts in the protective shielding gas environment to deposit a molten filler material along the weld seam. Portions of the aluminum alloy workpieces adjacent to and along the weld seam are also typically melted at the same time as the filler wire. The molten filler material ultimately interacts with the molten aluminum alloy present at the weld seam and, upon further advancement of the laser beam and filler wire, cools and solidifies. A laser weld joint is thus produced in the wake of the coordinated movement of the laser beam and the filler wire along the weld seam.

A high energy density laser beam is typically needed to concentrate heat within the aluminum alloy workpieces during laser welding on account of the relatively high thermal conductivity of aluminum alloys. Such a strong laser beam tends to produce a keyhole—which is a column of metal vapor and plasma—at the weld seam in the immediate surrounding vicinity of the laser beam. The keyhole penetrates into the aluminum alloy workpieces and initiates lateral melting of the workpieces to establish a surrounding molten weld pool that follows the path of the keyhole. While the produced keyhole allows for deeper melting of the aluminum alloy workpieces along the weld seam, it has a tendency to detract from the smoothness and overall visible appearance of the weld joint. The instability and turbulence of the keyhole, in particular, introduces porosity into the molten weld pool when the keyhole collapses and causes the weld joint to have a wavy and uneven surface appearance. Because of this, the weld joint usually has to be buffed or brushed or sanded before the laser welded part can be painted, which adds time and complexity to the overall manufacturing process.

SUMMARY OF THE DISCLOSURE

A method of laser welding aluminum alloy workpieces involves the use of dual laser beams in a cross-beam orientation. The aluminum alloy workpieces are first brought together to establish a weld seam. The dual laser beams and a filler wire are then moved along the weld seam, preferably under the cover of an inert shielding gas, leaving behind a laser weld joint in their wake. As part of forming the laser weld joint, the dual laser beams melt a working end of the filler wire to deposit molten filler material at and along the weld seam, and may even melt portions of the aluminum alloy workpieces adjacent to the weld seam without producing a keyhole that penetrates into the workpieces. In other words, if the aluminum alloy workpieces are melted by the dual laser beams, such melting occurs as a result of energy absorption and conduction (i.e., conduction welding) at the surfaces of the aluminum alloy workpieces, and not from the formation of a keyhole. The dual laser beams can function in conduction welding mode since their combined laser beam coverage area is greater than that of a single laser beam.

The dual laser beams include a first laser beam extending along a first longitudinal axis and a second laser beam extending along a second longitudinal axis. When arranged in the cross-beam orientation, a plane that intersects the first longitudinal axis and the second longitudinal axis of the first and second laser beams, respectively, forms a line where it meets the aluminum alloy workpieces that is oriented transverse to the weld seam. The aforementioned plane may be perpendicular to the weld seam, but does not necessarily have to be, as it can be angled by up to 45° from perpendicularity to the weld seam without affecting the intended function of the dual laser beams. As a result of their cross-beam arrangement, the coverage areas of the first and second laser beams may overlap at least to some extent. The overlapping coverage area produced by the two laser beams impinges the working end of the filler wire in order to fashion the laser weld joint along the weld seam without producing a keyhole. Moreover, in addition to being intersected by a plane that is transverse to the weld seam, the first and second longitudinal axes of the first and second laser beams may also converge towards one another as the laser beams approach the weld seam, although such convergence is not mandatory.

The dual laser beams, as mentioned above, can melt portions of the aluminum alloy workpieces adjacent to the weld seam by way of energy absorption and conduction at the surfaces of the workpieces. Such conductive melting is made possible because the combined beam coverage area of the first and second laser beams is greater than that of a single laser beam commonly employed with aluminum alloy workpieces, which, in turn, results in a decreased energy density being directed toward the weld seam and the filler wire. Melting the aluminum alloy workpieces by way of conduction—as opposed to producing a keyhole—leads to a laser weld joint that has a more visibly aesthetic and smooth appearance. In fact, when deployed, the dual laser beams can fabricate a laser weld joint having an exposed top surface that, as produced, can be painted without having to be smoothed by brushing, buffering, sanding, or some other suitable procedure. And while the dual laser beam set-up can be used to laser weld aluminum alloy workpieces suited for a wide variety of applications, it is particularly useful when the weld seam is or will be present, for example, on a Class A surface of an automobile component part.

BRIEF DESCRIPTION OF THE DRAWINGS

FIG. 4 is a cross-sectional view of the weld seam depicted in FIG. 1 taken along line 4-4;

FIG. 5 is a schematic illustration of a laser welding apparatus capable of directing the dual laser beams at an along a weld seam established between aluminum alloy workpieces;

FIG. 6 is a schematic illustration of the laser optic head of the laser welding apparatus depicted in FIG. 5; and FIG. 7 is a photomicrograph of a cross-section of the laser weld joint formed according to the EXAMPLE set forth in the disclosure.

DETAILED DESCRIPTION

Figure 1:
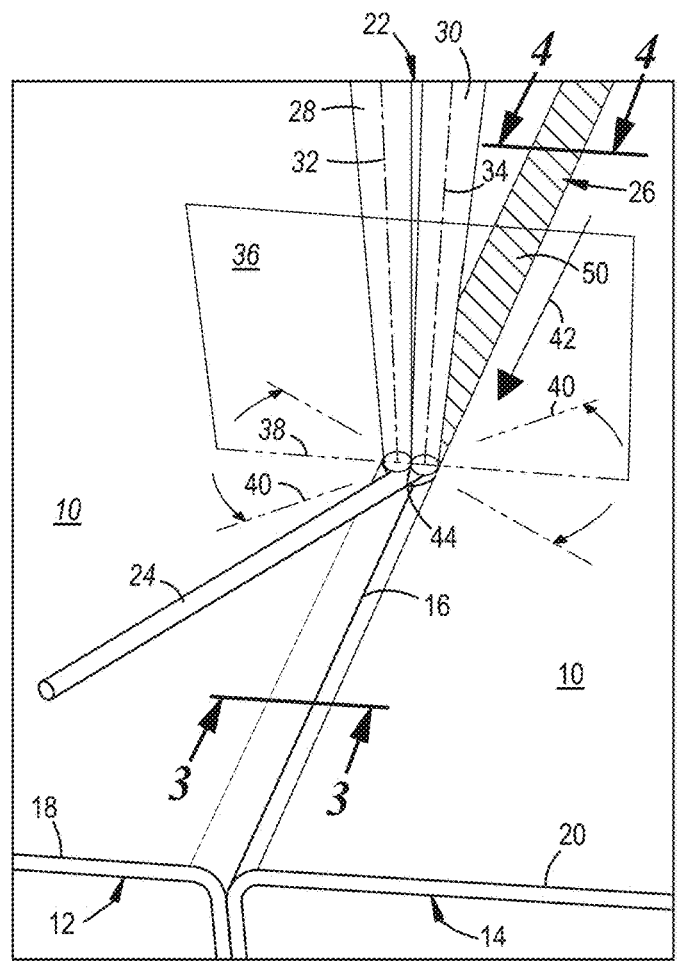
FIG. 1 is a top perspective view of a pair of aluminum alloy workpieces being laser welded along a weld seam by the coordinated movement of dual laser beams and a filler wire along the weld seam.

FIGS. 1-6 illustrate a preferred embodiment of a method for laser welding together aluminum alloy workpieces 10 during, for example, the manufacture of an automobile component part such as a roof, decklid, or trunk. The laser welding method employs dual laser beams arranged in a cross-beam orientation and may be practiced at what is intended to be a Class A surface of the component part. The aluminum alloy workpieces 10 may be composed of any suitable aluminum alloy together with its naturally-present surface oxide layer or, if desired, an alternative applied surface coating such as zinc, tin, or a metal conversion coating. Some examples of aluminum alloys that may be employed are a 5XXX series aluminum-magnesium alloy (e.g., AA5754), a 6XXX series aluminum-magnesium-silicon alloy (e.g., AA6022), and a 7XXX series aluminum-zinc alloy (e.g., AA7003). The term "workpiece" is used broadly in this disclosure to denote a sheet metal layer or any other kind of laser weldable substrate including a casting or an extrusion.

Referring now specifically to FIGS. 1-4, there is shown a first aluminum alloy workpiece 12 and a second aluminum alloy workpiece 14 that have been brought together to establish a weld seam 16 between them. Each of the first and second aluminum alloy workpieces 12, 14 includes an upper surface 18, 20 adjacent to the weld seam 16 that may ultimately become part of a Class A surface of a finished automobile component part. The upper surfaces 18, 20 can be generally flat, as shown, or they can exhibit a more complex three-dimensional profile. To join the first and second aluminum alloy workpieces 12, 14 by laser welding, dual laser beams 22 arranged in a cross-beam orientation are directed at and moved along the weld seam 16 in conjunction with a filler wire 24 to produce a laser weld joint 26 behind and in the wake of the coordinated movement of the laser beams 22 and filler wire 24, as will be explained in greater detail below.

The dual laser beams 22 include a first laser beam 28 and a second laser beam 30. Each of the first and second laser beams 28, 30 may have a power ranging from 500 W to 10 kW depending on a variety of factors including the exact composition and thickness of the first and second aluminum alloy workpieces 12, 14, the composition of the filler wire 24, and the scanning speed of the dual laser beams 22 along the weld seam 16. The first and second laser beams 28, 30 may be any suitable type that can deliver the power demanded by the laser welding operation, particularly in a manufacturing setting. Examples of such laser beams include, for example, a near-infrared fiber-delivered laser beam, which are commercially available from a variety of suppliers such as IPG Photonics (Corporate headquarters in Oxford, Mass.) and Trumpf Inc. (North American headquarters in Farmington, Conn.).

The first laser beam 28 extends along a first longitudinal axis 32 and the second laser beam 30 extends along a second longitudinal axis 34. When arranged in the cross-beam orientation, a plane 36 that intersects the first longitudinal axis 32 and the second longitudinal axis 34 of the first and second laser beams 28, 30, respectively, forms a line 38 where the plane 36 meets the upper surfaces 18, 20 of the aluminum alloy workpieces 12, 14 that is oriented transverse to the weld seam 16. The line 38 may be perpendicular to the weld seam 16, as shown, or it may be angled by up to 45° from perpendicularity to the weld seam 16 in either direction as depicted by broken lines 40. The first and second longitudinal axes 32, 34 of the first and second laser beams 28, 30 may also converge towards one another and the weld seam 16 within the plane 36. Such convergence brings the first and second laser beams 28, 30 together at the weld seam 16 such that the beam coverage areas attributed to the laser beams 28, 30 overlap at least to some extent. The first and second longitudinal axes 32, 34 of the first and second laser beams 28, 30, however, do not necessarily have to converge and meet at the weld seam 16. The axes 32, 34 of the laser beams 28, 30 can be parallel, or they can cross at some point before arriving at the weld seam 16, while still fostering overlapping beam coverage areas at least to some extent.

Once they are directed and focused towards the weld seam 16, the dual laser beams 22 are moved along the weld seam 16 in a welding direction 42 together with the filler wire 24 to produce the weld joint 26. The filler wire 24 includes a working end 44 that tracks the movement of the dual laser beams 22 along the weld seam 16 and is impinged by both the first laser beam 28 and the second laser beam 30, as shown generally in FIGS. 1 and 3. The filler wire 24 is preferably composed of an aluminum alloy such as, for example, 4043 or 4047 aluminum-silicon alloy. And while a large variety of aluminum alloy filler wires are commercially available, a typical filler wire suitable for use with the dual laser beams 22 has a diameter of about 1 mm to about 2 mm. In a preferred embodiment, as shown in FIG. 2, the filler wire 24 precedes the first and second laser beams 28, 30 along the weld seam 16 in the welding direction 42, and the first and second laser beams 28, 20 are tilted away from the filler wire 24 so that their longitudinal axes 32, 34 are offset from normal in a direction opposite the welding direction 42 (i.e., the first and second laser beams 28, 30 are tilted in a "pushing" arrangement), although other set-ups are certainly possible. Additionally, a shielding gas nozzle 46 moves along the weld seam 16 with the dual laser beams 22 and the filler wire 24 to dispense an inert shielding gas 48 such as argon. The inert shielding gas 48 provides an oxygen-free environment in the surrounding vicinity of the dual laser beams 22 and the working end 44 of the filler wire 42.

The energy provided by the impinging first and second laser beams 28, 30 melts the working end 44 of the filler wire 24—which is maintained by continuously feeding the filler wire 24 forward as it is melted and consumed—and results in molten filler material being deposited at and along the weld seam 16. The energy provided by the first and second laser beams 28, 30 may also melt portions of the aluminum alloy workpieces 12, 14 adjacent to the weld seam 16 without producing a keyhole that penetrates into the workpieces 12, 14; that is, the energy of the first and second laser beams 28, 30 initiates melting by being absorbed and conducted by the parts of the aluminum alloy workpieces 12, 14 that lie within the beam coverage areas and are thus impinged by the first and/or second laser beams 28, 30. Such conductive melting is attainable because the combined beam coverage area projected by the first and second laser beams 28, 30 is greater than it would otherwise be if a single laser beam was used. The expanded beam coverage area, in turn, decreases the energy density being directed toward the weld seam 16 and the filler wire 24, thus avoiding the creation of a keyhole. The molten filler material and, if initiated, the molten portions of the aluminum alloy workpieces 12, 14, are protected against unacceptable oxidation by the localized oxygen-free environment maintained by the inert shielding gas 48.

Figure 2:
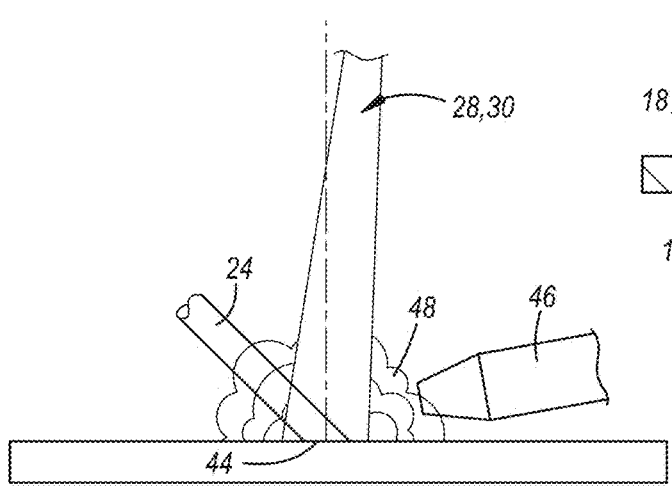
FIG. 2 is a cross-sectional side view of the laser welding operation being performed in FIG. 1.
Figure 3:
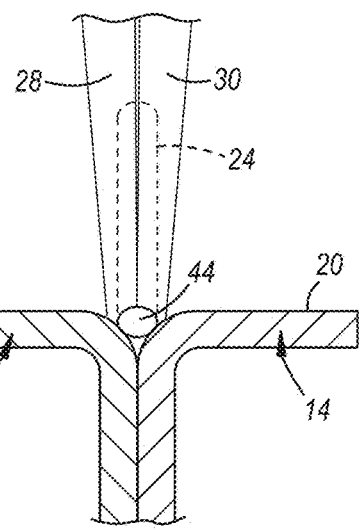
FIG. 3 is a cross-sectional view of the weld seam depicted in FIG. 1 taken along line 3-3.

The molten filler material derived from the filler wire 24 hardens into the weld joint 26 behind the dual laser beams 22 as the dual laser beams 22 and the filler wire 24 advance along the weld seam 16 in the welding direction 42, as shown in FIGS. 1 and 4. And regarding the mechanics of the weld joint 26, it may or may not encompass coalescence with the aluminum alloy workpieces 12, 14. The molten filler material, for instance, may coalesce with the melted portions of the aluminum alloy workpieces 12, 14 if melting of the workpieces 12, 14 occurs, or it may simply wet the aluminum alloy workpieces 12, 14 if melting of the workpieces 12, 14 does not occur. In either scenario, the formed weld joint 26 has a top surface 50 that spans the weld seam 16 and connects the upper surfaces 18, 20 of the first and second aluminum alloy workpieces 12, 14. Because the dual laser beams 22 did not create a keyhole during their translation along the weld seam 26, the top surface 50 of the weld joint 26 is smooth and visibly aesthetic. Specifically, the as-produced top surface 50 can be painted in many instances without having to be brushed, buffed, sanded, or otherwise smoothed beforehand. This degree of surface smoothness is especially desirable—and practical from a manufacturing perspective—when the upper surfaces 18, 20 of the aluminum alloy workpieces 12, 14 and the weld joint 26 are expected to eventually exhibit Class A surface quality.

The dual laser beams 22 can be directed, focused, and moved along the weld seam 16 by any suitable laser welding device. For example, as shown in FIGS. 5-6, a laser welding apparatus 52 of the conventional variety may be used. The laser welding apparatus 52 includes a laser optic head 54, which is coupled to a laser beam generator 56 by a fiber optic cable 58, and a robot arm 60 that supports and carries the laser optic head 54. The robot arm 60 may be connected to a base 62 and is constructed with rotary, swivel, hinge, and/or other types of junctions that permit the arm 60 to move the laser optic head 54 along the weld seam 16 in a controlled manner. And while not explicitly shown in FIG. 5 (or FIGS. 1-2), the filler wire 24 and the shielding gas nozzle 46, if employed, may be supported by the laser optic head 54 to ensure coordinated movement of the dual laser beams 22, the filler wire 24, and the shielding gas nozzle 46 along the weld seam 16.

The laser optic head 54 includes optical components that fabricate the dual laser beams 22. As shown schematically in FIG. 6, the dual laser beams 22 are formed by a beam splitting sequence. In the depicted embodiment, the laser beam generator 56 is activated to deliver a diverging conical laser beam 64 from an end of the fiber optic cable 58 located within the laser optic head 54. The diverging conical laser beam 64 then passes through a collimating lens 66—such as a curved (e.g., parabolic or spherical) lens—to transform the diverging conical laser beam 64 into a collimated laser beam 68 that has a fairly constant beam diameter along its length. Next, a portion of the collimated laser beam 68 is passed through an optical beam-splitting prism 70. The two split beam portions of the collimated laser beam 68 then pass through a focusing lens 72, which can be curved like the collimating lens 66, to focus and direct the split beam portions towards the weld seam 16 as the first and second laser beams 28, 30. Other components or parts not represented in the schematic illustration of FIG. 6 may of course be present including, for example, a reflector and a protective cover.

The preferred method of using dual laser beams 22 to laser weld the first and second aluminum alloy workpieces 12, 14 along the weld seam 16, as just described, is subject to several variations within the knowledge of skilled artisans including, for instance, the exact design and construction of the laser welding apparatus 52. For that and other reasons, the above description of preferred exemplary embodiments and the following Example are merely descriptive in nature; they are not intended to limit the scope of the claims that follow. Each of the terms used in the appended claims should be given its ordinary and customary meaning unless specifically and unambiguously stated otherwise in the specification.

EXAMPLE

To demonstrate a specific implementation of the method described above, two 1.2 mm thick AA6111 coupons 10' were brought together to establish a weld seam between them, as shown in FIG. 7. Dual laser beams, each having a power of about 1875 W, were fabricated using an optical prism as a beam splitter. The dual laser beams were directed and moved along the weld seam in conjunction with a 1.6 mm diameter AA4047 filler wire at a speed of about 60 mm/s. The laser beams melted the working end of the filler wire as well as portions 74 of the aluminum alloy coupons 10' adjacent to the weld seam without producing a keyhole. As shown in FIG. 7, the deposited molten filler material hardened into a laser weld joint 76 that exhibited a smooth top surface 78 on account of the relative stability of the conduction welding mechanism as compared to a keyhole welding mechanism. The top surface 78 of the weld joint 76 was observed to be visibly acceptable for a Class A surface of a finished automobile component part and smooth enough that very minimal to no brushing would be needed in order to render the surface amenable to painting.

The invention claimed is:
1. A method of laser welding aluminum alloy workpieces, the method comprising:
 providing a first aluminum alloy workpiece and a second aluminum alloy workpiece that are brought together to form a weld seam, each of the first aluminum alloy workpiece and the second aluminum alloy workpiece having an upper surface adjacent to the weld seam that constitutes part of a show surface;
 directing dual laser beams toward the weld seam established between the aluminum alloy workpieces, the dual laser beams comprising a first laser beam extend- ing along a first longitudinal axis and a second laser beam extending along a second longitudinal axis, the first laser beam having a beam coverage area and the second laser beam having a beam coverage area, wherein the beam coverage areas of the first and second laser beams overlap to produce an expanded combined beam coverage area, and wherein a plane that intersects the first and the second longitudinal axes of the first and second laser beams forms a line where the plane meets the first and second aluminum alloy workpieces that is transverse to the weld seam;

moving the dual laser beams along the weld seam together with a filler wire without producing a keyhole that penetrates into the first and second aluminum alloy workpieces;

melting a working end of the filler wire with the dual laser beams to deposit molten filler material along the weld seam as the dual laser beams and the filler wire are moved along the weld seam, the molten filler material solidifying behind the dual laser beams into a laser weld joint; and feeding the filler wire into the expanded combined beam coverage area of the first and second laser beams so that, as the filler wire is melted and consumed, the working end of the filler wire continues to track the weld seam and be impinged by both the first and second laser beams within the expanded combined beam coverage area as the first and second laser beams move along the weld seam.

2. The method set forth in claim 1, wherein the dual laser beams melt portions of the first and second aluminum alloy workpieces adjacent to the weld seam, and wherein the melted portions of the first and second aluminum alloy workpieces harden along with the molten filler wire material and become part of the laser weld joint.

3. The method set forth in claim 1, wherein each of the first and second laser beams has a power ranging from 500 W to 10 kW.

4. The method set forth in claim 1, wherein a laser optic head directs the dual laser beams towards the first and second aluminum alloy workpieces, and wherein a robot arm carries and moves the laser optic head so that the dual laser beams move along the weld seam.

5. The method set forth in claim 1, wherein the filler wire is composed of an aluminum alloy.

6. The method set forth in claim 1, wherein the first and second aluminum alloy workpieces together form part of an automobile component part, and wherein the weld seam established between the first and second aluminum alloy workpieces is exposed at a visible exterior surface of the automobile component part.

7. The method set forth in claim 1, wherein the laser weld joint formed along the weld seam has a top surface.

8. The method set forth in claim 7, further comprising:
painting the first and second aluminum alloy workpieces including the top surface of the laser weld joint, as produced, without having to smooth the top surface of the laser weld joint.

9. The method set forth in claim 1, further comprising:
directing a shielding gas at the weld seam where the working end of the filler wire is melted by the dual laser beams.

10. The method set forth in claim 1, wherein the first and second laser beams converge towards one another as the first and second laser beams approach the weld seam.

11. A method of laser welding aluminum alloy workpieces, the method comprising:

directing dual laser beams toward a weld seam established between an upper surface of a first aluminum alloy workpiece and an upper surface of a second aluminum alloy workpiece, each of the upper surface of first aluminum alloy workpiece and the upper surface of the second aluminum alloy workpiece constituting part of a show surface, the dual laser beams comprising a first laser beam extending along a first longitudinal axis and a second laser beam extending along a second longitudinal axis such that a plane intersecting the first and the second longitudinal axes of the first and second laser beams forms a line where the plane meets the first and second aluminum alloy workpieces that is transverse to the weld seam, the first and second laser beams converging towards one another as the first and second laser beams approach the weld seam so that a beam coverage area of the first laser beam and a beam coverage area of the second laser beam overlap to produce an expanded combined beam coverage area;

positioning a working end of a filler wire at the weld seam such that the working end of the filler wire is impinged by both the first and second laser beams within the expanded combined beam coverage area and melted into molten filler material;

moving the dual laser beams and the filler wire along the weld seam to deposit molten filler material at the weld seam without producing a keyhole that penetrates into the first and second aluminum alloy workpieces, the molten filler material solidifying behind the dual laser beams into a laser weld joint having a top surface; and feeding the filler wire into the expanded combined beam coverage area of the first and second laser beams so that, as the filler wire is melted and consumed, the working end of the filler wire continues to track the weld seam and be impinged by both the first and second laser beams within the expanded combined beam coverage area as the first and second laser beams move along the weld seam.

12. The method set forth in claim 11, wherein the dual laser beams melt portions of the first and second aluminum alloy workpieces adjacent to the weld seam, and wherein the melted portions of the first and second aluminum alloy workpieces harden along with the molten filler wire material and become part of the laser weld joint.

13. The method set forth in claim 11, wherein a laser optic head directs the dual laser beams towards the first and second aluminum alloy workpieces, and wherein a robot arm carries and moves the laser optic head so that the dual laser beams move along the weld seam.

14. The method set forth in claim 11, wherein the filler wire is composed of an aluminum alloy.

15. The method set forth in claim 11, wherein the first and second aluminum alloy workpieces together form part of an automobile component part, and wherein the weld seam established between the first and second aluminum alloy workpieces is exposed at a visible exterior surface of the automobile component part.

16. The method set forth in claim 11, further comprising:
painting the first and second aluminum alloy workpieces including the top surface of the laser weld joint, as produced, without having to smooth the top surface of the laser weld joint.

17. The method set forth in claim 11, wherein the working end of the filler wire is impinged by both the first and second laser beams and melted in an oxygen-free environment provided by an inert shielding gas that is directed towards, and moved along the weld seam in conjunction with, the dual laser beams and the filler wire.

18. The method set forth in claim 1, wherein the first and second laser beams cross each other before arriving at the weld seam.

19. The method set forth in claim 11, wherein the first and second laser beams cross each other before arriving at the weld seam.

\* \* \* \* \*